Jan. 17, 1967  W. W. JORDAN  3,298,408
CONTROL UNIT FOR ELECTRICAL SETWORKS FOR SAWMILL CARRIAGE
Filed June 22, 1964  7 Sheets-Sheet 7

INVENTOR.
William W. Jordan
BY T W Secrest

United States Patent Office 3,298,408
Patented Jan. 17, 1967

3,298,408
CONTROL UNIT FOR ELECTRICAL SETWORKS FOR SAWMILL CARRIAGE
William W. Jordan, 15615 34th NE., Seattle, Wash. 98155
Filed June 22, 1964, Ser. No. 376,886
11 Claims. (Cl. 143—115)

This invention is for a control unit for an electrical setworks for a sawmill carriage.

The sawing of a log, especially a large log, is accomplished by mounting or placing a log on a sawmill carriage. The carriage firmly holds the log, and moves past a saw. The saw may be a band saw or a rotating saw. The log is held on the carriage by means of dogs. These dogs are positioned on knees which advance toward the sawline and which knees also, advance the log toward the sawline. The knees are moved by means of a setshaft and appropriate gears. The setshaft is driven by a motor through a gear box. At one time the sawyer was positioned on the sawmill carriage. The sawyer either sat on the carriage or stood on the carriage. At a later date controls were placed on the sawmill carriage with a sawyer control box off of the carriage and near the saw. At the sawyer control box there were placed control buttons for controlling the operation of the controls on the sawmill carriage. One of these control units is disclosed in the United States Letters Patent Number 2,661,036, Balch et al. This particular control unit controls the advancement of the knees and the log toward the sawline and is based on the angular displacement of the first rotating member. Upon predetermined advancement of the knees and a predetermined angular displacement of the rotating member an electrical control circuit is opened and the setshaft stops rotating. Then the first rotating member returns to its initial or zero position. In other words, the first rotating member is reset to the zero position.

In this invention a pulse generator is mounted on the sawmill carriage. The pulse generator may be connected to the motor or may be connected to the setshaft. Off the sawmill carriage there are mounted controls such as a counting circuit. The pulse generator sends pulses to the counting circuit. With advancement of the knees and the advancement of the sawline, the pulse generator emits the pulses and sends them to the counting circuit. The circuit for controlling the advancement of the knees connects with the counting circuit. The pulse generator emits pulses which go to the counting circuit. Then, upon the counting circuit counting a certain number of pulses the circuit controlling the knees is opened and the knees no longer advance. In this manner the thickness of lumber to be cut from a log is determined. The pulse generator may run continuously, if connected to the motor for driving the setshaft, or may run intermittently if connected with the setshaft or equivalent.

Accordingly, an object of this invention is a provision of an electrical setworks for a sawmill carriage, and which setworks has a high degree of accuracy; the provision of a control unit having solid-state components and which solid-state components have a high degree of reliability and a long life; a control which is of a rugged construction; a control wherein the major part of the setworks is not mounted on the carriage but is mounted off of the carriage; a control which has substantially no weight, and is small in volume and that part of the control which is mounted on the sawmill carriage is both lightweight and small in volume; a control which has a high degree of versatility as it can be used for different types of lumber such as pine, fir, hemlock, and, a control which is capable, to a degree, of self-diagnosis of a fault so as to assist in the servicing of the control.

These, and other important objects and advantages of the invention will be more particularly brought forth upon reference to the drawings, a detailed specification of the invention and the claims.

Figure 1:
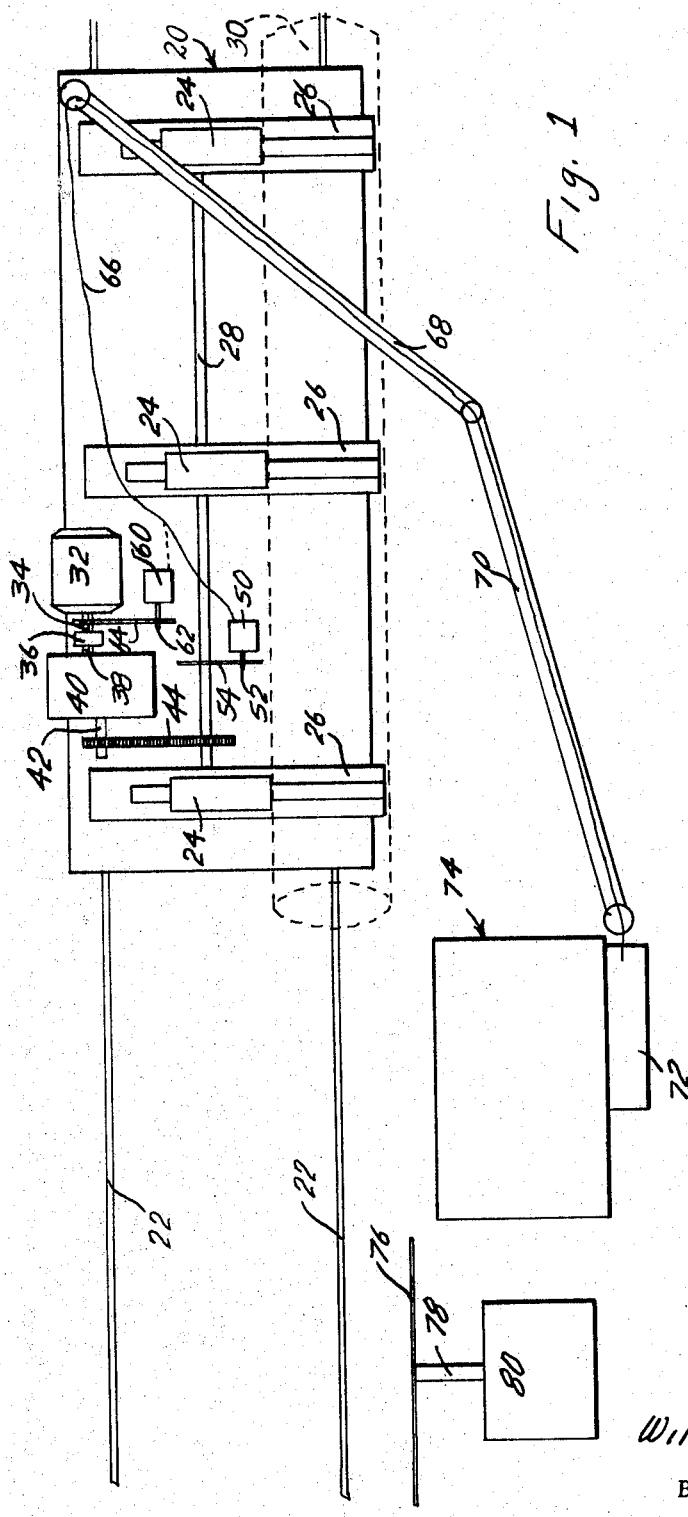
FIGURE 1 is a schematic plan view of a sawmill carriage, a saw and control box; and, there is shown the pulse generator on the carriage as connected with the setshaft and also as connected with the motor.

In FIGURE 1 there is a schematic illustration of a sawmill carriage 20. This carriage 20 is designed to run on two tracks 22. The wheels of the carriage are not illustrated. On the carriage there are three spaced-apart knees 24. These knees are mounted in guide members 26. The knees connect, through suitable gears, with a setshaft 28. The knees 24, by means of dogs are not shown, hold a log 30. The log, when in position to be sawed, projects out beyond the edge of the carrier so as to be in the way of the saw so that lumber is capable of being removed from the log. The means for driving the setshaft comprises an electric motor 32 having an output shaft 34. The output shaft 34 is coupled by a coupling 36 to the input shaft 38 of a gear box 40. The gear box 40 has an output shaft 42. On the output shaft 42 there is a sprocket not shown and on the setshaft 28 there is a sprocket not shown. A chain 44 connects the sprocket on the output shaft 42 and the sprocket on the setshaft 28 so that the gear box is in driving relation with the setshaft. Mounted on the sawmill carriage 20 is a pulse generator 50. This pulse generator 50 has an input shaft 52. On the input shaft 52 is a sprocket 53 and on the setshaft 28 is a sprocket 43. These two sprockets are in alignment. A chain 54 connects the sprocket 43 on the setshaft 28 with the sprocket 53 on the input shaft 52 so that the setshaft drives the pulse generator 50. Another way of connecting a pulse generator is illustrated with pulse generator 60. The pulse generator 60 has an input shaft 62. On the input shaft 62 is a sprocket and on the output shaft 34 of the motor 32 is a sprocket. A chain 64 connects the sprocket on the shaft 34 with the sprocket on the shaft 62. In this manner the motor 32 is in a driving relationship with the pulse generator 60. It is to be understood that on a sawmill carriage that there are usually not two pulse generators but only one. The pulse generator on a sawmill carriage may connect with an intermittently running shaft, i.e., setshaft 28 or a continuously running shaft, viz., motor output shaft 34 or gear box input shaft 38. The pulse generator 50 and the pulse generator 60 may connect by means of electrical cable 66 and through protective tubing 68 and 70 with the rest of the electrical control unit in control box 72. The control box 72 connects with the sawyer's control box 74. In the sawyer's control box 74 there may be a control panel having a number of push-buttons corresponding to the advancement of the knees 24 according to the thickness of the lumber to be sliced from the log 30. The sawyer's control box 74 may be adjacent a saw 76 mounted on an output shaft 78 of an electric motor 80.

Figure 2:
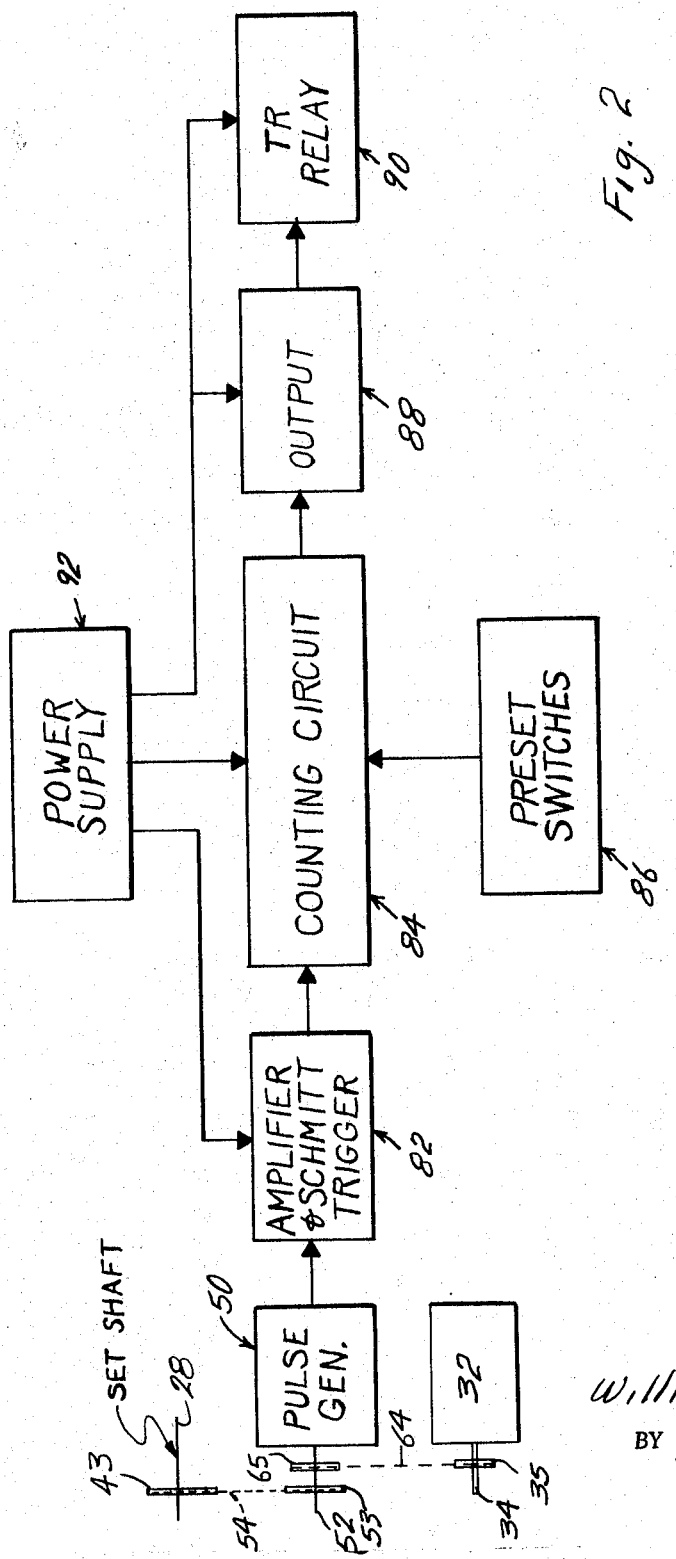
FIGURE 2 is a schematic electric electrical diagram, in block form, of the electrical circuitry for the setworks.

In FIGURE 2 there is illustrated the electrical diagram, in block form, of the components for controlling the advancement of the knees 24 on the sawmill carriage. It is seen there is illustrated a pulse generator 50 which connects with a Schmitt trigger and amplifier 82. The amplifier and Schmitt trigger 82 lead into a counting circuit 84. A control for counting circuit 84 is a box of preset switches 86. The preset switches are physically located at the sawyer's control box 74. The counting circuit 84 connects with an output circuit 88 which in turn connects with a timer relay TR90. There is a power supply 92 for supplying power at correct voltages and with proper ripple to the amplifier and Schmitt trigger 82, counting circuit 84, output 88 and timer relay TR90. Also, to the left of the pulse generator 50 there is figuratively illustrated a setshaft 28 having a sprocket 43. On the input shaft 52 of the pulse generator 50 there is a sprocket 53. A chain 54 connects the sprockets 43 and 53 so that the setshaft 28 is in driving relationship with the pulse generator 50. Also, there is schematically illustrated a sprocket 35 on the output shaft 34 of the motor 32. On the input shaft 52 of the pulse generator 50 there is illustrated a sprocket 65. A chain 64 connects the sprocket 35 and the sprocket 65 so that the motor 32 is in a driving relationship with the pulse generator 50.

Figure 3:
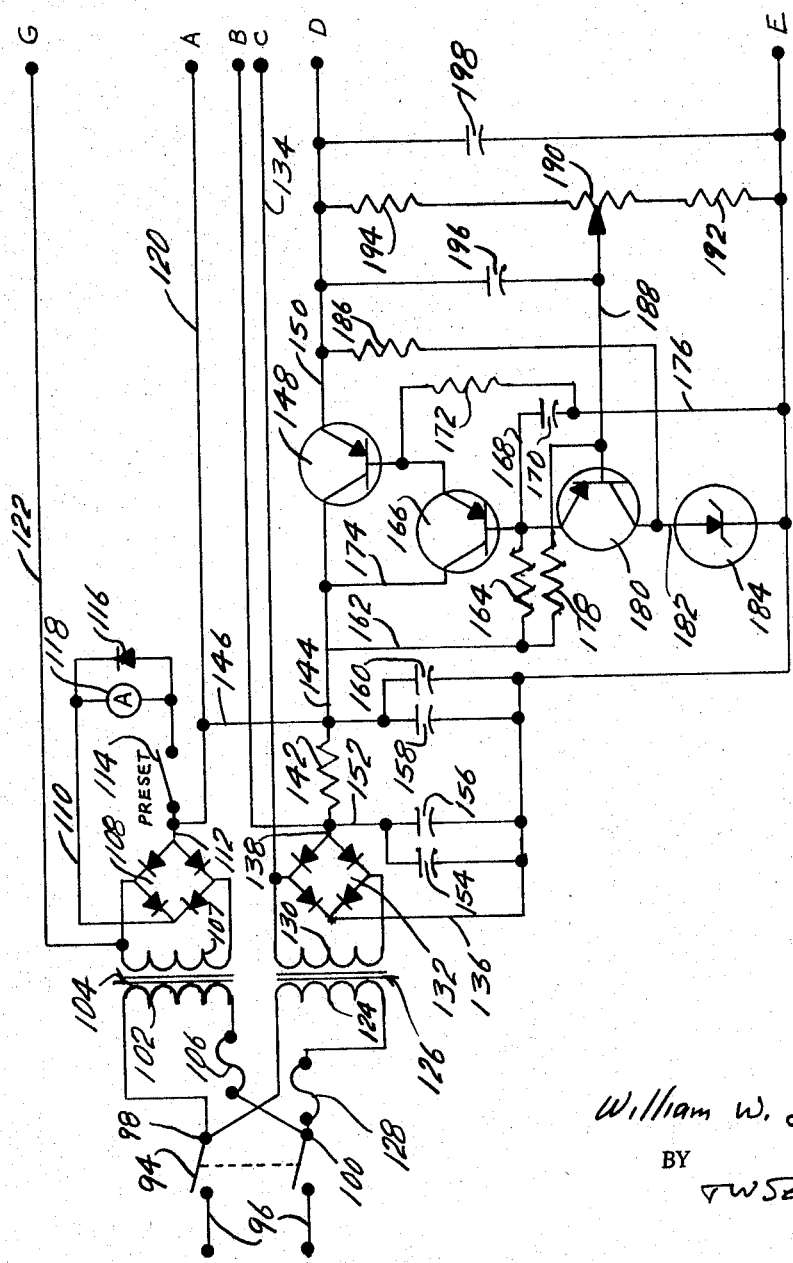
FIGURE 3 is a circuit for the power supply for the electrical setworks.

In FIGURE 3 there is illustrated the wiring diagram for the power supply 92. It is seen that this power supply comprises a double-pole switch 94 which connects with leads 96 of a single-phase 120-volt alternating current line. The switch 94 connects with the contacts 98 and the contacts 100. The contacts 98 and 100 connect with the primary coil 102 of a first transformer 104. The contact connects with the primary through a fuse 106. The transformer 104 has a secondary 107 which connects with a diode-rectifier-bridge 108. The rectifier-bridge 108 has an output lead 110 and an output lead 112. On the output lead 112 there is a single-pole switch 114. A diode 116 connects the leads 112 and 110. There may be a relay coil 118 across the diode 116. The lead 112 also connects with a lead 120 which is also identified as lead A. The secondary 107 of the transformer also connects with a lead 122 which may also be referred to by reference numeral G. The potential across the leads 120 and 122 is 120-volts direct current.

The contacts 98 and 100 of the switch 94 also connect with a primary 124 of a transformer 126. The contact 100 connects with the primary 124 through fuse 128. The transformer 126 has a secondary 130 which connects with a diode-rectifier-bridge 132. Also, the secondary 130 connects with an output lead 134 also identified as C. The rectifier-bridge 132 has an output lead 136 and an output lead 138. The output line 112 connects through lead 146 with a line 144. Also, the output line 136 is identified as E. The output 138 also connects with a resistor 142 which in turn connects with the lead 144. The lead 144 connects with the collector of a PNP transistor 148. The emitter of the transistor 148 connects with the lead 150 and which lead also connects with line D. A lead 152 connects with the output 112 of the diode rectifier-bridge 132 through resistor 142 and lead 146. This lead 152 connects through capacitors 154 and 156 with a lead 136. It is seen that the two capacitors 154 and 156 are parallel. The lead 144 connects through two capacitors 158 and 160 with lead 136. It is seen that the two capacitors 158 and 160 are in parallel. The lead 144 also connects by means of lead 162 with a resistor 164. The resistor 164 connects with a base of the PNP transistor 166. The resistor 164 also connects by means of a lead 168 with a capacitor 170. The capacitor 170 connects through resistor 172 with the base of the transistor 148 and the emitter of the transistor 166. It is seen that the base of the transistor 148 and the emitter of the transistor 166 are electrically connected. Also, the lead 144 connects by means of lead 174 with the collector of transistor 166. The capacitor 170 connects by means of lead 176 with the line 136. The lead 162 connects through a resistor 178 with the base of a PNP transistor 180. The base of the transistor 166 and the emitter of the transistor 180 are electrically tied together. The collector of the transistor 180 connects by means of lead 182 with zener diode 184. The zener diode 184 connects with the line 136. The lead 182 connects through resistor 186 with the line 150. The base of the transistor 180 connects by means of line 188 with a variable resistor 190. The variable resistor 190 connects with line 136 through a fixed resistor 192 and connects with line 150 through a fixed resistor 194. The line 188 connects through a capacitor 196 with the line 150. On the output side the line 150 connects with the line 136 through a capacitor 198.

The potential across the leads 120 and 122, A and G, is 120-volts direct current. The contacts A and G connect with the trouble test circuit.

The potential across the leads 140 and 136, B and E, is 34-volts direct current.

The potential across the leads 134 and 136, C and E, is 34-volts pulsating direct current at a rate of 60 pulses per second.

The potential across the leads 150 and 136, D and E, is 20-volts direct current.

Figure 4:
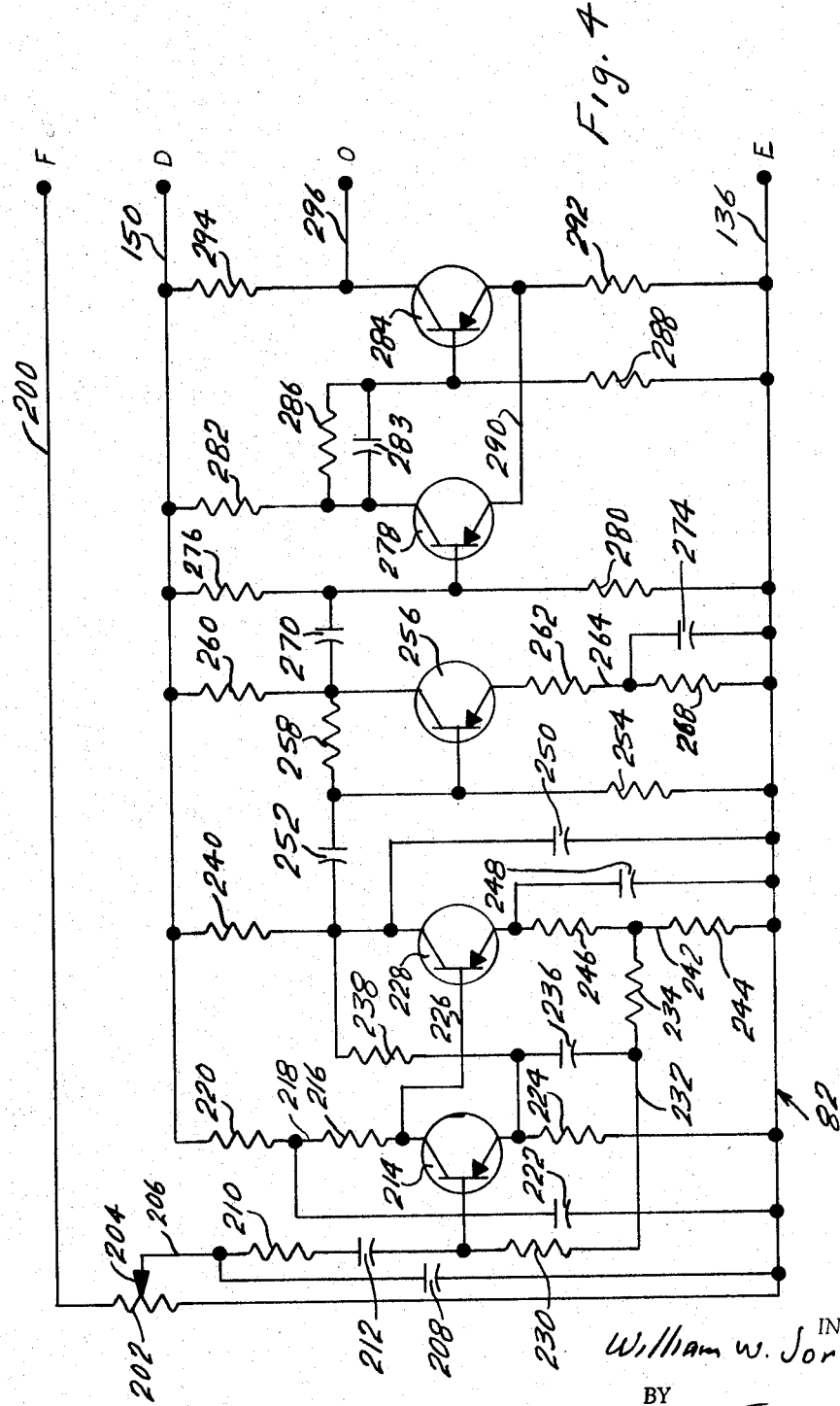
FIGURE 4 is a circuit of an amplifier and a Schmitt trigger for the electrical setworks.

In FIGURE 4 there is illustrated the electrical circuit for the amplifier and Schmitt trigger. The power input to the amplifier and the Schmitt trigger is through the ground lead 136 at E and the lead 150 at D. It is recalled that the potential across D and E is 20-volts direct current. The pulse input to the amplifier is through lead 200, F. The pulse input is a sine wave from the pulse generator 50, or 60, as the case may be. The lead 200 connects through a variable potentiometer 202 with the ground 136. The variable potentiometer 202 has a movable contact 204. This contact 204 connects with a lead 206. In turn the lead 206 connects through a capacitor 208 with a lead 136. Also, the lead 206 connects through a resistor 210 and a capacitor 212 with a base of a PNP transistor 214. The collector of the PNP transistor 214 connects with a resistor 216. The resistor 216, by means of lead 218, connects with the resistor 220. The resistor 220 connects with the lead 150. The lead 218 connects through capacitor 222 with ground 136. The emitter of the transistor 214 connects with the ground 136 through resistor 224. The collector of the transistor, by means of lead 226, connects with the base of a PNP transistor 228. The base of the PNP transistor 214 connects with a resistor 230 which in turn, by means of lead 232, connects with the resistor 234. The lead 232 connects with a capacitor 236 which is tied to the emitter of the transistor 214. The capacitor 236 also connects with the resistor 238. The resistor 238 is tied to the collector of the PNP transistor 228 and also connects with the line 150 through a resistor 240. The resistor 234 connects with the lead 242. This lead 242 connects with the ground 136 through a resistor 244. The lead 242 also connects with the emitter of PNP transistor 228 through resistor 246. The emitter of transistor 228 connects with the ground 136 through capacitor 248. The collector of the transistor 228 connects with the ground 136 through capacitor 250. The collector of the transistor 228 connects with the capacitor 242. The capacitor 252 connects with the ground 136 through resistor 254 and also connects with the base of the transistor 256. In addition the capacitor 252, through resistor 258, connects with the collector of the transistor 256. The collector of the transistor 256 connects with the line 150 through resistor 260. The emitter of the transistor 256 connects with the resistor 262. The resistor 262, by means of lead 264, connects with the resistor 268. The resistor 268 connects with the ground 136.

The preceding has been a description of the three-stage amplifier for amplifying the sine wave pulse from the pulse generator.

The amplifier is connected to the Schmitt trigger. The amplifier is electrically connected to the Schmitt trigger through capacitors. More particularly, the resistance 258 and the collector of the transistor 256 are connected by capacitor 270 to a lead 272. The lead 264 is connected by a capacitor 274 to the ground 136. The lead 272 connects, by means of resistor 276, to the lead 150. Also, the lead 272 connects with the base of a PNP transistor 278, and connects with the ground 136 through a resistor 280. The collector of the PNP transistor 278 connects through a resistor 282 with the wire 150. Also, the collector of the transistor 278 also connects with the base of the PNP transistor 284 through a resistor 286 in parallel with a capacitor 283. The base of the PNP transistor 284 connects with the ground 136 through a resistor 288. The emitter of the transistor 278 connects with the emitter of the transistor 284 through a lead 290. The emitter of the transistor 284 connects with the ground 136 through the resistor 292. The collector of the transistor 284 connects with the wire 150 through a resistor 294. The output of the Schmitt trigger is through a lead 296, also identified as lead O, and the ground 136, also identified as lead E.

The function of the Schimtt trigger is to take the amplified pulse from the amplifier and produce a pulse of suitable characteristic for the counting circuit 84.

Figure 5:
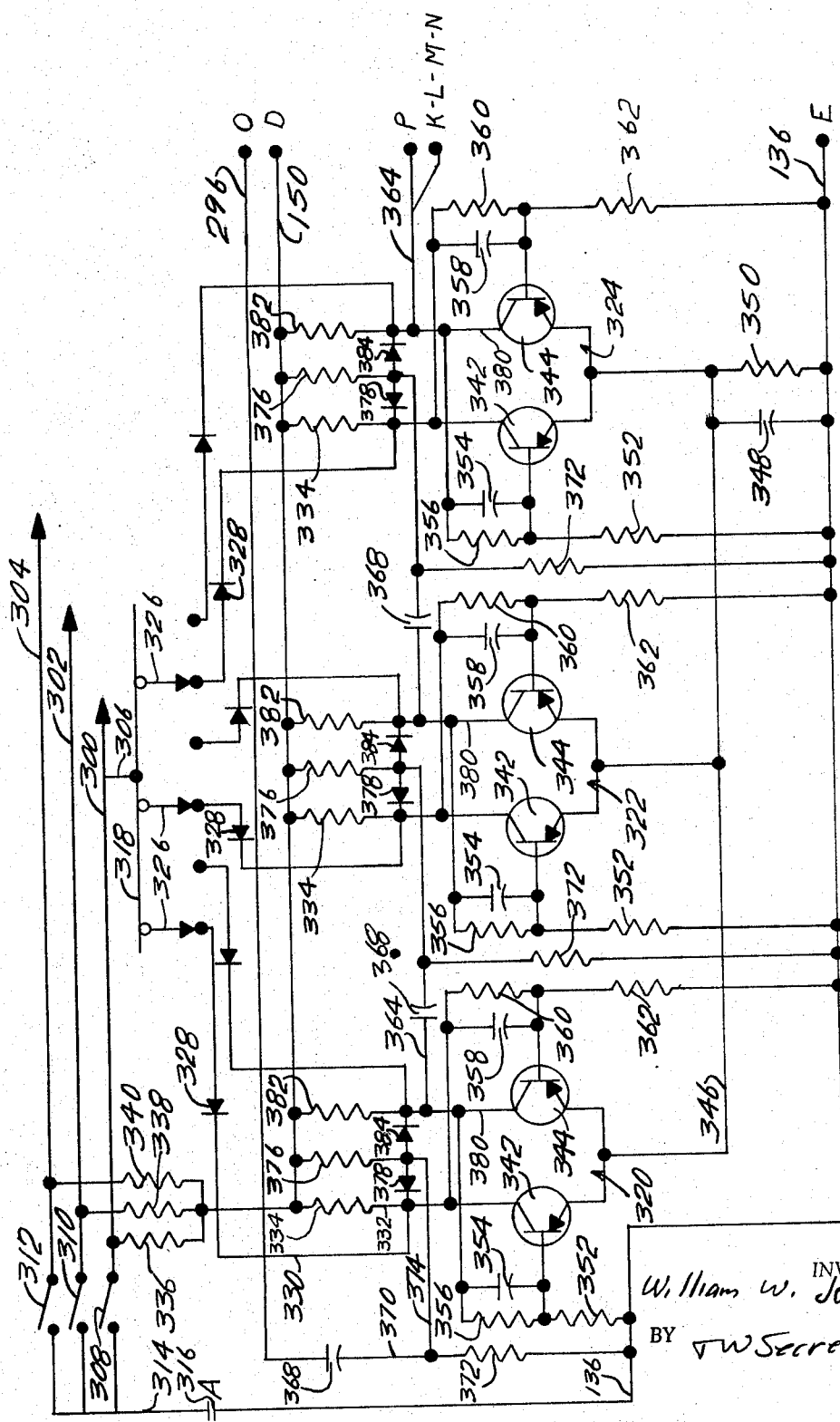
FIGURE 5 is the electrical diagram of the counting circuit.

In FIGURE 5 there is illustrated a portion of the binary or digital counting circuit. The counting circuit comprises the flip-flop transistor circuits for counting. In FIGURE 5 it is seen that there are two transistors in a flip-flop circuit, and that there are three flip-flop circuits in a group. Further, this is not shown on the drawing, there are four groups for a set of the knees on the sawmill carriage. More particularly, the counting circuit in FIGURE 5 schematically shows one-fourth of the transistors employed in my full counting circuit. In other words, I employ twelve flip-flop circuits having twenty-four transistors. With the twelve flip-flop circuits, it is possible to count 4,096 pulses. With this counting circuit it is possible to have a large number of sets for the knees. Actually, since the counting circuit is capable of 4,096 pulses it is possible to have 4,096 sets for the knees. From a practical standpoint, the number of sets for the knees will, in most instances, be limited from ten to twenty sets. In FIGURE 5 there is illustrated an arrangement to have three sets of the knees as there are three separate circuits indicated by leads 300, 302 and 304. It is seen that connecting with the lead 300 that there is a lead 306 which in turn connects with a group of three flip-flop circuits. It is to be realized by the reader that connecting with the lead 300 there are three other groups of flip-flop circuits having three flip-flop circuits each so as to make a total of twelve flip-flop circuits having a total of twenty-four transistors. In the line 300 there is a switch 308; in the line 302 there is a switch 310; and, in the line 304 there is a switch 312. The switches 308, 310 and 312 may be located at the sawyer's control box 74 and may be actuated by the sawyer or may be located remotely from the sawyer's control box 74. If remotely located from the sawyer's control box 74, then these switches may be relay actuated or actuated by other means. The switches 308, 310 and 312 connect with a lead 314 which in turn connects with normally opened contacts of relay 316. The contacts of relay 316 connect with ground 136.

The lead 306 which connects with the line 300 also connects with the bus 318. The bus 318 connects with the three flip-flop circuits 320, 322 and 324. The three flip-flop circuits 320, 322 and 324 are identical and therefore like reference numerals will be used for corresponding components. The bus 318 connects with the lead 326 which in turn connects with the diode 328. The diode 328 connects with the lead 330 which in turn connects with a lead 332. The lead 332 connects with a resistor 334. This resistor 334 connects with three resistors 336, 338 and 340. The resistor 336 connects with the line 300; the resistor 338 connects with the line 302; and the resistor 340 connects with the line 304. It is to be understood that if there were ten sets for the knees then there would be ten lines like line 300, and there would be ten resistors like the 336, or 338, or 340.

The line 332 connects with the collector of the PNP transistor 342. The PNP transistor 342 is one of the two transistors in the first flip-flop circuit. The other transistor is PNP transistor 344. The emitters of the two PNP transistors 342 and 344 connect with a lead 346 which in turn connects with the ground 136 through capacitor 348 and through resistor 350. The capacitor 348 and the resistor 350 are in parallel. The base of the transistor 342 connects with the ground 136 through resistor 352. Also, the base of the transistor 342 connects with the emitter 344 through capacitor 354 and resistance 356. The capacitor 354 and the resistor 356 are in parallel. The base of the transistor 344 connects with the collector of the transistor 342 through capacitor 358 and resistor 360. The capacitor 358 and the resistor 360 are in parallel. The base of the transistor 344 connects with the ground 136 through resistor 362. The output of the flip-flop circuit 320 is from the collector of the transistor 344. This collector connects with lead 364. The lead 364 leads into the second flip-flop circuit 322. Likewise, the output of the second flip-flop circuit leads into the input of the third flip-flop circuit 324. The input to the flip-flop circuit is through the lead 296 which connects with a capacitor 368 which in turn connects with a lead 370. The lead 370 connects with the ground 136 through resistor 372. There is a minus 20-volt source of direct current through line 150, see D. The line 370 connects by means of line 374 and resistor 376 with the line 150. The line 374 connects with the line 332 through diode 378. The collector of the transistor 344 connects with the lead 380 which in turn connects with the line 150 through resistor 382. The lead 374 connects with the lead 380 through diode 384.

Again, it is to be stated that there are shown only three of the twelve flip-flop circuits. These three are identified as 320, 322 and 324. There are in addition three other groups of three flip-flop circuits each so as to have a total of twelve. The output of the transistor 324 is fed through line 364, P, into the next group of flip-flop circuits.

The twelve flip-flop circuits are preset so that upon receiving a certain number of pulses they will de-activate the driving means for running the setshaft of the electrical set works.

Figure 6:
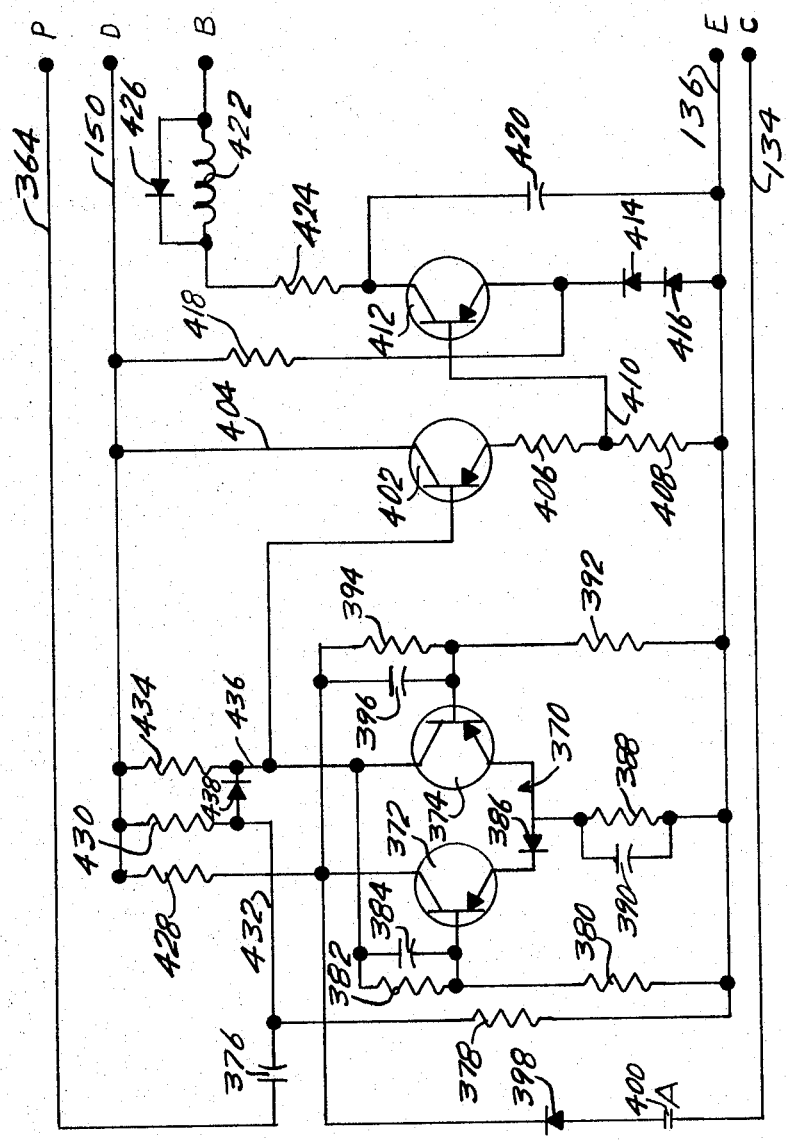
FIGURE 6 is an electrical diagram of the output circuit.

The output of the digital counter at P, from the twelve flip-flop circuits, is fed into the driver circuit, see FIGURE 6.

The input signal at P, is fed into an output flip-flop circuit and then the signal is fed into the driver circuit for the timer relay. The circuitry to accomplish this is as follows. There is an amplifier 370 comprising a first PNP transistor 372 and a second PNP transistor 374. A lead 364 connects with the capacitor 376. This capacitor in turn connects with the ground 136 through resistor 378. The base of the first transistor 372 connects with the ground 136 through resistor 380. The base of the transistor 372 connects with the collector of the transistor 374 through resistor 382 and a capacitor 384. The resistor 382 and the capacitor 384 are in parallel. The emitter of the transistor 372 collects with the emitter of the transistor 374 through a diode 386. The emitter of the transistor 374 connects with ground 136 through a resistor 388 and a capacitor 390. The resistor 388 and the capacitor 390 are in parallel. The base of the transistor 374 connects with the ground 136 through the resistor 392. The base of the transistor 374 connects with the emitter of the transistor 372 through the resistor 394 and the capacitor 396. The resistor 394 and the capacitor 396 are in parallel. The capacitor 396, the resistor 394 and the collector of the transistor 372, connect with a diode 398 which in turn connects with normally open contacts of relay 400, relay A. One set of contacts for the relay 400 connects with lead 134, C. The output of the transistor 374, the collector, connects with the base of a PNP transistor 402, the collector of 402 connects with line 150 through lead 404. The emitter of 402 connects with ground 136 through resistor 406 and resistor 408. A lead 410 connects with the two resistors 406 and 408 and leads into the base of a PNP transistor 412. The emitter of the transistor 412 connects with the ground 136 through two diodes 414 and 416. Also, the emitter 412 connects with line 150 through the resistor 418. The collector of 412 connects with the ground 136 through capacitor 420 and connects with primary relay coil 422 through a resistor 424. The coil 422 is bridged by a diode 426. The coil 422 connects with the 34 volt direct current source of electricity at B.

It is recalled the line 150 is a minus 20-volt direct current source of electricity. The line 150 connects with the collector of transistor 372 through a resistor 428. Also, the line 150 connects with diode 398 and with the capacitor 396 and resistor 394. Further, line 150 connects with the capacitor 376 through resistor 430 and a lead 432. The line 150 also connects with the base of the transistor 402 and the collector of the transistor 374 through a resistor 434 and a lead 436. The lead 432 and the lead 436 are connected by a diode 438.

The signal from the counting circuit is fed into the output flip-flop transistors 372 and 374 through the lead 364. Then the output of the transistor 374 is fed into the first transistor 402 amplifier and from this is fed into the second transistor 412 of the relay driver. The signal turns off the two transistors 402 and 412 so that no current flows through the coil 422. This opens the contact of the timer relay.

Prior to running through a cut of a log on a sawmill carriage, I will briefly review the operation of a sawmill carriage. In FIGURE 1 is is seen that the log 30 is advanced by the knees 24. The knees are driven through suitable gearing associated with the setshaft 28. The setshaft is driven by means of a sprocket, a chain 44, and the sprocket on the output shaft 42 of the gear box 40. The driving means for the gear box 40 is a motor 32 connected by means of the shafts 38 and 34 and coupler 36. In the gear box 40 there are clutches for engaging and disengaging the output shaft 42 and the other shafts so that the output shaft 42 does not rotate. These clutches may be air clutches or electrical clutches or other suitable clutching means. After the knees have advanced a log a suitable distance, a predetermined distance, the clutches in the gear box 40 are disengaged. As a result, the output shaft 42 is not in a driving relationship with the setshaft 28 and the knees no longer advance the log 30 toward the sawline. This control unit is to control the advancement of the knees 24 and the log 30 toward the sawline. The control unit is such that it de-energizes the clutches in the gear box 40 so that the output shaft 42 is not in a driving relation with the setshaft 28.

Other descriptions of a sawmill setworks, the carriage, and the control unit for the setworks may be found in the patent of Balch et al., 2,661,036. Another description of a gear box may be found in a patent to Pease, 3,128,860.

Figure 9:
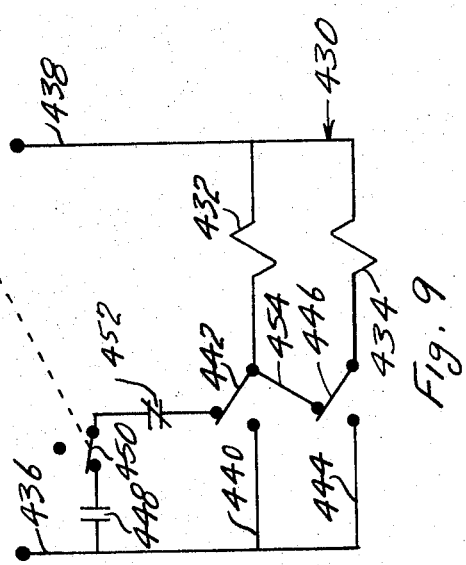
FIGURE 9 is the electrical circuit for the preset relay.

In FIGURE 9 there is a schematic wiring diagram 430. This wiring diagram shows a coil 432 and a coil 434. The coil 432 controls the engaging and the disengaging of a forward clutch in a gear box, i.e., a clutch for driving the output shaft of the gear box in a forward direction. The coil 434 controls the reverse clutch in a gear box for driving the output shaft in a reverse direction. In the particular gear box employed on the set works for which I have made this control unit, it is necessary to simultaneously activate coils 432 and 434 for driving the output shaft of the gear box in a forward direction. It is to be realized that another gear box of a different design may need only the forward coil 432 activated to drive the output shaft in the gear box in a forward direction. There are two input lines, line 436 and line 438. The voltage across lines 436 and 438 may be 120-volts alternating current or direct current. Connecting with the lines 436 may be a line 440. The line 440 may connect with the coil 432 through a switch 442. A line 444 may connect with a line 436. A switch 446 may connect the line 444 with the coil 434. Also, the line 436 may connect with the coil 432, and also the coil 434 through timer relay contacts 448, a switch 450, and relay contacts 452. The relay contacts 452 connect with the switch 442. Also, the switch 442 connects with the lead 454 which in turn connects with the switch 446.

The timer relay contacts 448 are under the control of the timer relay 422. The relay contacts 452 are under the control of the relay coil 118, see FIGURE 3.

From FIGURE 9 it is seen that in order for the gear box to drive the setshaft that it is necessary for electrical energy to pass through the coils 432 and 434 to close the clutches in the gear box so as to rotate the output shaft. In order to accomplish this it is necessary for both the timer relay contacts 448 and contacts 454 to be simultaneously closed with the switch 442 in electrical contact with the closed contacts 452 and also the switch 446 in electrical contact with the closed contacts 452. It is seen that it is possible to manually depress the switch 442 so that its contact with the line 440 activates the forward coil 432 and to manually depress the switch 446 so that its electrical contact with the line 444 to actuate the coil 434.

Upon the simultaneous closing of the relay contacts 448 and 452 the gear box is in a driving relationship with the setshaft 28 so that the knees 24 and the log 30 advance toward the sawline.

To stop the advancement of the knees toward the sawline, it is necessary to open the contacts 448 or to open the contacts 452. With my arrangement, the stopping of the advancement of the knees toward the sawline is accomplished by opening the contacts 448, see timer relay coil 422 in FIGURE 6, so that the clutches are no longer actuated and the output shaft to the gear box is no longer rotating or the setshaft is not being driven.

As previously stated, the counter has twelve flip-flop circuits. In order to completely operate all of these twelve flip-flop circuits starting from a zero state it is necessary to have 4,096 pulses. In the pulse generator I employ, for one revolution of the pulse generator there is emitted one-hundred pulses. For the purpose of illustration, assume that one revolution of the pulse generator, the emission of one-hundred pulses, corresponds to an advance of one-half inch of the knees 24. Again, to operate the counter completely it is necessary to pass 4,096 pulses through the counting circuit. Assume that a one-inch plank or slab is to be taken off of a log 30 on the sawmill carriage. If one-hundred pulses correspond to a one-half inch advancement of the knees then a one-inch advancement of the knees, or a one-inch slab of lumber from the log, will correspond to two-hundred pulses. To cut off the transistors 402 and 412 so that electric energy no longer flows through the coil 422, there will be required two-hundred pulses to the counting circuit. Therefore, the counting circuit is preset so that there is the equivalent of 3,896 pulses in the counting circuit before adding the two-hundred pulses. This predetermination of the 3,896 pulses is accomplished by means of pre-established conditions through the bus bar 318 and lead 326 and associated circuitry of the counting circuit. Again, it is possible to have sufficient number of pre-established sets so that the knees can advance for only one pulse and therefore have approximately 4,095 sets. From a practical standpoint there will nominally be from ten to twenty sets. Upon the passing of the two-hundred pulses through the counting circuit the transistors 402 and 412 are cut off; and, therefore, electric energy ceases to flow through the relay coil 422 and the relay contacts 448 open so that there is no electric energy through the coils 432 and 434. The output shaft of the gear box 40 ceases to operate and the setshaft ceases to operate and the knees cease to advance.

An illustration of an actual operation of this control unit is as follows. Assume that a log has been cut and a sawyer wishes to take off a one-inch slab of lumber. See FIGURE 3, the sawyer depresses the switch 114 so that the relay coil 118 is actuated. In FIGURE 9 the relay contacts 452, under the control of the relay coil 118, are opened; in FIGURE 5 the relay contacts 316 are closed and in FIGURE 6 the relay contacts 400 are closed. Upon closing the relay contacts 316 in FIGURE 5, the transistors are grounded so that they are set to the predetermined state. Also the closing of the relay contact 400 in FIGURE 6, grounds the transistors so that they are set to the predetermined state.

The preset switch 114 is opened. The contacts 452, see FIGURE 9, close or assume their normally closed position.

In FIGURE 5 the contacts 316, and in FIGURE 6 the contacts 400 open. Now, the sawyer can close the switch which corresponds to a one-inch advancement of the knees or the log. In this particular instance, the sawyer closes the switch 308, see FIGURE 5. As previously stated, the counting circuit has a predetermined set of 3,896 counts as selected by the sawyer. With the closing of contacts 400, the transistors 402 and 412 start conducting so that timer relay 422 is actuated and the contacts 448 are closed. With the closing of the contacts 448 the coils 432 and 434 are actuated and the output shaft of the gear box is driven and drives the set works. The pulse generator starts emitting pulses and, with two-hundred pulses being emitted, the output flip-flop 370 is triggered so as to send a signal to the transistors 402 and 412 and to cut off the action of these two transistors. With the cut-off of the two transistors 402 and 412 electric energy ceases to flow through the coil 422, see FIGURE 9, the contacts 448 are opened and electric energy ceases to flow through the coils 432 and 434. The output shaft of the gear box is no longer being driven, the setshaft is no longer being driven and the knees cease to operate.

From this description, it is seen that, by the means of the pulse generator and the counting of the pulses, it is possible to have a very accurate and close regulation of the advancement of the knees 24 and the log 30 toward the sawline. Actually, the electrical control unit comprising the pulse generator is more accurate than available mechanical equipment associated with the sawmill set works.

The pulse generator may run intermittently off of the setshaft, or other intermittent running shaft, such as the output shaft of the gear box, or the pulse generator may run continuously off of the output shaft of the electric motor. This is possible because the circuit for counting the pulses is not activated and the circuit for closing the relay contacts 448 and activating the coils 432 and 434, is not activated until the preset switch 114 is allowed to depress so as to ground the transistors in the counting circuit, and to ground the transistors 372, 374, 402 and 412, and then the reset switch 114 allowed to rise so as to close the relay contacts 452, see FIGURE 9. Also, it is necessary for the sawyer to activate the preset switch for determining the advancement of the knees, such a switch being 308, 310 or 312 or equivalent. Only then will the counting circuit start to operate or function. The pulse generator may continuously emit pulses, when connected with the output shaft of the electric motor, but these pulses do not go to the counting circuit, and therefore have no effect on the advancement or retardation of the knees 24 and the log 30.

Figure 8:
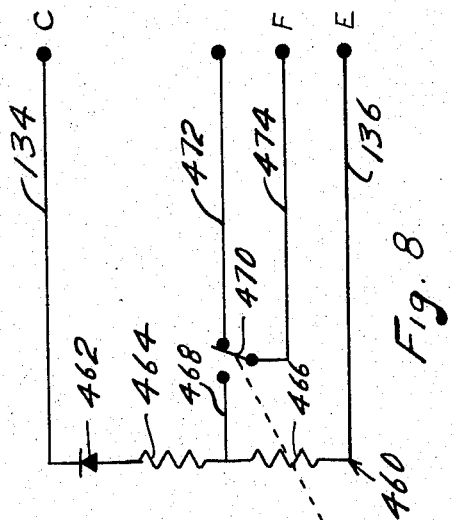
FIGURE 8 is the electrical diagram of the switching circuit to switch from the pulse generator to a sixty cycle 120 volt alternating current test voltage.

In FIGURE 8 there is illustrated a test switch circuit for testing the control unit without using the pulse generator and also for testing the control unit with the pulse generator. This test circuit is identified by reference numeral 460, and shows the ground 136, the reset circuit 134 and a diode 462. The diode 462 connects with a resistor 464. The resistor 464 also connects with the resistor 466. Between the resistors 464 and 466 there is connected a lead 468. The lead 468 connects with the switch 470. The switch 470 connects with the line 472 and also a line 474. Actually, the switch 470 connects the line 472 and the line 474 or connects line 468 and line 474. The line 472 connects with the pulse generator and takes signal from the pulse generator. With the switches shown in FIGURE 8 the signal from the pulse generator travels through the switch and the line 474 to line 200, see FIGURE 4, leading into the amplifier and the Schmitt trigger. For test purposes a 60-cycle pulse signal may be applied at 134, C, and travel through the diode 462, the resistance 464, lead 468, switch 470 and lead 474 to F. At F this 60-cycle signal can be fed into the amplifier and Schmitt trigger.

It is seen that a dotted line runs from the switch 470 in FIGURE 8 to the switch 450 in FIGURE 9. This is to symbolize that the coils 432 and 434 may be activated while a signal is running from the pulse generator to the counting circuit or else will be de-activated while a 60-cycle signal is applied to the switch 470 so as to send pulses to the amplifier and the Schmitt trigger as well as to the counting circuit and the output circuit. This makes it possible to test the entire unit without moving the knees on the sawmill carriage.

Figure 10:
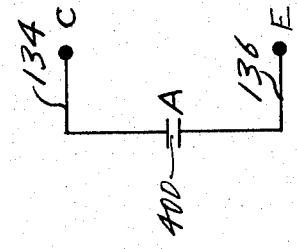
FIGURE 10 is the electrical circuit for resetting the pulse generator.

In FIGURE 10 there is illustrated the relay contacts 400 of FIGURE 6, this is just a schematic illustration.

Figure 7:
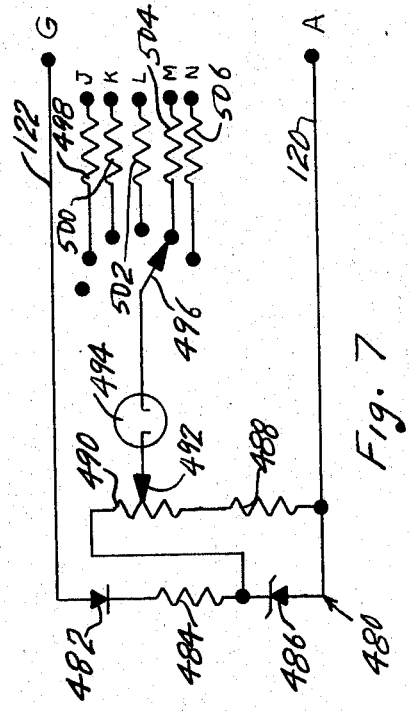
FIGURE 7 is the electrical diagram of the trouble test circuit.

In FIGURE 7 there is illustrated a trouble test circuit for testing the flip-flop circuits and the counter. See FIGURE 3 where there is shown the power supply and the leads 120 and 122. The lead 122 connects with a diode 482 which in turn connects with a resistor 484. The lead 120 connects with a zener diode 486. Also, the lead 120 connects with the resistor 488, and a variable resistor 490. The variable resistor 490 connects with the resistor 484 and the zener diode 486. The variable resistor 490 has a movable contact 492. The contact 492 connects with a neon lamp 494. The neon lamp 494 connects with a movable contact 496 which in turn connects with a number of resistors, 498, J; 500, K; 502, L; 504, M; and 506, N. The resistors 498, 500, 502, 504 and 506 connect with lead 510, see FIGURE 5, which in turn connects with lead 364. The circuit 480 makes it possible to visually check the operation of the flip-flop circuits and the counter to see if these counters are functioning. The neon lamp 494 fluctuates in intensity upon the proper operation of the flip-flop circuits.

What I claim is:
1. A sawmill carriage and an electrical control unit, said sawmill carriage having knees for advancing a log toward the sawline, said electrical unit, comprising:
    (a) a pulse generator;
    (b) means connecting the pulse generator and the knees so that with the advancement of the knees the pulse generator generates pulses;
    (c) a counting circuit for the pulses; and,
    (d) means responsive to the counting of the pulses so that with a predetermined number of pulses the knees cease to advance.

2. A combination of a sawmill carriage and an electrical control unit:
   (a) said sawmill carriage having knees for advancing a log toward the sawmill;
   (b) said electrical control unit comprising a pulse generator;
   (c) means connecting the pulse generator and the knees so that with the advancement of the knees the pulse generator generates pulses;
   (d) a counting circuit for the pulses; and,
   (e) means responsive to the counting of the pulses so that with a predetermined number of pulses the knees cease to advance.

3. A sawmill carriage and an electrical control unit, said sawmill carriage having knees for advancing a log toward the sawline, a setshaft, means for driving the setshaft, said electrical control unit comprising:
   (a) a pulse generator;
   (b) means connecting the setshaft and the pulse generator with the setshaft in a driving relation with the pulse generator;
   (c) a counting circuit for the pulses; and,
   (d) means responsive to the counting of pulses so that with a predetermined number of pulses the knees cease to advance.

4. A sawmill carriage and an electrical control unit; said sawmill carriage having knees for advancing a log toward the sawline, a setshaft, driving means for driving the setshaft, said electrical control unit comprising:
   (a) a pulse generator;
   (b) means connecting the driving means and the pulse generator with the driving means in a driving relation with the pulse generator;
   (c) said pulse generator being continuously running to emit pulses;
   (d) a counting circuit for the pulses; and,
   (e) means responsive to the counting of the pulses so that with a predetermined number of pulses the knees cease to advance.

5. A sawmill carriage and an electrical control unit, said sawmill carriage having knees for advancing a lot toward the sawline, a setshaft, means for driving the setshaft, said electrical control unit comprising:
   (a) a pulse generator for emitting pulses;
   (b) a counting circuit for the pulses;
   (c) means for connecting the pulse generator and the counting circuit;
   (d) means connecting the setshaft and the pulse generator with the setshaft in a driving relation with the pulse generator;
   (e) means to set the counting circuit to count a predetermined number of pulses; and,
   (f) means responsive to the counting of the pulses so that with a predetermined number of pulses the knees cease to advance.

6. A sawmill carriage having knees for advancing a log toward a sawline, a first means for controlling the knees and for advancing of the log, an electrical control unit for controlling the first means, said control unit comprising:
   (a) a pulse generator for generating pulses;
   (b) a second means connecting the pulse generator and the first means;
   (c) a counting circuit for the pulses; and,
   (d) a third means responsive to the counting circuit to control the operation of the first means.

7. A sawmill carriage comprising in combination:
   (a) knees for advancing a log toward a sawline;
   (b) a setshaft;
   (c) a first means connecting the knees and the setshaft;
   (d) a gear box;
   (e) said gear box having an output shaft;
   (f) a second means connecting the output shaft and the gear box;
   (g) a motor connecting with and driving the gear box;
   (h) a pulse generator for emitting pulses;
   (i) a counting circuit;
   (j) said pulse generator connecting with and supplying pulses to the counting circuit;
   (k) a control circuit for controlling the output shaft of the gear box;
   (l) said counting circuit connecting with the control circuit; and,
   (m) a third means making the pulse generator responsive to the setshaft so as to have the pulse generator emit pulses upon the rotation of the setshaft.

8. A sawmill carriage comprising in combination:
   (a) knees for advancing a log toward a sawline;
   (b) a setshaft;
   (c) a first means connecting the knees and the setshaft;
   (d) a gear box;
   (e) said gear box having an output shaft;
   (f) a second means connecting the output shaft and the gear box;
   (g) a motor connecting with and driving the gear box;
   (h) a pulse generator for emitting pulses;
   (i) a counting circuit;
   (j) said pulse generator connecting with and supplying pulses to the counting circuit;
   (k) a control circuit for controlling the output shaft of the gear box;
   (l) said counting circuit connecting with the control circuit; and,
   (m) means to substantially simultaneously activate the counting circuit to receive pulses and to activate the setshaft.

9. A sawmill carriage comprising in combination:
   (a) knees for advancing a log toward a sawline;
   (b) a setshaft;
   (c) a first means connecting the knees and the setshaft;
   (d) a gear box;
   (e) said gear box having an output shaft;
   (f) a clutch in the gear box for controlling the output shaft;
   (g) a second means connecting the output shaft and the gear box;
   (h) a motor connecting with and driving the gear box;
   (i) a pulse generator for emitting pulses;
   (j) a counting circuit for counting pulses;
   (k) said pulse generator connecting with and supplying pulses to the counting circuit;
   (l) a circuit for controlling the clutch and having a first switch means and a second switch means;
   (m) said second switch means being normally closed;
   (n) a control circuit for controlling the first switch means;
   (o) a fourth means for setting the counting circuit to an initial condition and for opening the second switch means;
   (p) a fifth means for setting the counting circuit to a predetermined state so as to receive a predetermined number of pulses;
   (q) said fifth means substantially simultaneously activating the counting circuit to receive pulses and activating the control circuit to close the first switch means;
   (r) said counting circuit connecting with said control circuit; and,
   (s) said counting circuit upon receiving said predetermined number of pulses activating said control circuit to open said first switch means to disengage the clutch and to stop the rotation of the output shaft of the gear box.

10. A sawmill carriage comprising in combination:
   (a) knees for advancing a log toward a sawline;
   (b) a setshaft;
   (c) a first means connecting the knees and the setshaft;
   (d) a gear box;

(e) said gear box having an output shaft;
(f) a clutch in the gear box for controlling the output shaft;
(g) a second means connecting the output shaft and the gear box;
(h) a motor connecting with and driving the gear box;
(i) a pulse generator for emitting pulses;
(j) a counting circuit for counting pulses;
(k) said pulse generator connecting with and supplying pulses to the counting circuit;
(l) a circuit for controlling the clutch and having a first switch means and a second switch means;
(m) said second switch means being normally closed;
(n) a control circuit for controlling the first switch means;
(o) a fourth means for setting the counting circuit to an initial condition and for opening the second switch means;
(p) a fifth means for setting the counting circuit to a predetermined state so as to receive a predetermined number of pulses;
(q) said fifth means substantially simultaneously activating the counting circuit to receive pulses and activating the control circuit to close the first switch means;
(r) said counting circuit connecting with said control circuit;
(s) said counting circuit upon receiving said predetermined number of pulses activating said control circuit to open said first switch means to disengage the clutch and to stop the rotation of the output shaft of the gear box; and
(t) a sixth means making the pulse generator responsive to the setshaft so as to have the pulse generator emit pulses upon the rotation of the setshaft.

11. A sawmill carriage comprising in combination:
(a) knees for advancing a log toward a sawline;
(b) a setshaft;
(c) a first means connecting the knees and the setshaft;
(d) a gear box;
(e) said gear box having an output shaft;
(f) a clutch in the gear box for controlling the output shaft;
(g) a second means connecting the output shaft and the gear box;
(h) a motor connecting with and driving the gear box;
(i) a pulse generator for emitting pulses;
(j) a counting circuit for counting pulses;
(k) said pulse generator connecting with and supplying pulses to the counting circuit;
(l) a circuit for controlling the clutch and having a first switch means and a second switch means;
(m) said second switch means being normally closed;
(n) a control circuit for controlling the first switch means;
(o) a fourth means for setting the counting circuit to an initial condition and for opening the second switch means;
(p) a fifth means for setting the counting circuit to a predetermined state so as to receive a predetermined number of pulses;
(q) said fifth means substantially simultaneously activating the counting circuit to receive pulses and activating the control circuit to close the first switch means;
(r) said counting circuit connecting with said control circuit;
(s) said counting circuit upon receiving said predetermined number of pulses activating said control circuit to open said first switch means to disengage the clutch and to stop the rotation of the output shaft of the gear box;
(t) said motor continuously running; and,
(u) a sixth means making the pulse generator responsive to the motor so as to have the pulse generator continuously emit pulses.

References Cited by the Examiner

UNITED STATES PATENTS

| | | | |
|---|---|---|---|
| 2,661,036 | 12/1953 | Balch et al. | 143—120 |
| 2,985,282 | 5/1961 | Elwortny | 143—120 |
| 3,066,709 | 12/1962 | Bale et al. | 143—120 |
| 3,088,501 | 5/1963 | Good et al. | 143—120 |

ANDREW R. JUHASZ, *Primary Examiner.*

WILLIAM W. DYER JR., *Examiner.*

W. D. BRAY, *Assistant Examiner.*